United States Patent [19]
Akutagawa et al.

[11] Patent Number: 5,305,848
[45] Date of Patent: Apr. 26, 1994

[54] AUTOMOBILE POWERTRAIN STRUCTURE INCLUDING AUTOMATIC TRANSMISSION FOR TRANSVERSE ENGINE

[75] Inventors: Hitoshi Akutagawa, Hiroshima; Junichi Okita, Iwakuni; Osamu Kameda, Hiroshima; Sakumi Hasetoh, Hiroshima; Yoshimichi Tanaka, Hiroshima, all of Japan

[73] Assignee: Mazda Motor Corporation, Hiroshima, Japan

[21] Appl. No.: 922,922

[22] Filed: Jul. 31, 1992

[30] Foreign Application Priority Data

| Jul. 31, 1991 [JP] | Japan | 3-192275 |
| Jul. 31, 1991 [JP] | Japan | 3-192278 |
| Jul. 31, 1991 [JP] | Japan | 3-192294 |
| Aug. 9, 1991 [JP] | Japan | 3-200412 |

[51] Int. Cl.⁵ ............................ B60K 5/04
[52] U.S. Cl. ........................ 180/292; 180/297; 74/606 R
[58] Field of Search ............ 180/292, 297; 74/606 R; 123/195 R

[56] References Cited

U.S. PATENT DOCUMENTS

| 3,703,107 | 11/1972 | Piret | 180/297 X |
| 4,364,285 | 12/1982 | Morisawa et al. | 74/606 R |
| 4,938,098 | 7/1990 | Sasaki et al. | 180/297 X |
| 5,078,662 | 1/1992 | Taguchi et al. | 74/606 R X |
| 5,085,186 | 2/1992 | Kobayashi | 123/195 R |

FOREIGN PATENT DOCUMENTS

| 0416636 | 3/1991 | European Pat. Off. | 180/297 |
| 4143102 | 7/1992 | Fed. Rep. of Germany | 180/297 |
| 4209731 | 10/1992 | Fed. Rep. of Germany | 180/297 |
| 47-9448 | 3/1972 | Japan . | |
| 1-316561 | 12/1989 | Japan . | |

Primary Examiner—Margaret A. Focarino
Assistant Examiner—Peter C. English
Attorney, Agent, or Firm—Keck, Mahin & Cate

[57] ABSTRACT

An automotive powertrain has an engine placed within an engine compartment and oriented so that its crankshaft is directed transversely. The powertrain also has an automatic transmission placed in the engine compartment behind the engine, and a torque converter operationally coupled to the crankshaft and input shaft of the transmission. Input and are output shafts of the transmission are arranged coaxially with each other and are directed parallel to the crankshaft of the engine. A hydraulic control valve body, through which controlled hydraulic pressure is applied to the transmission so as to shift the transmission, is placed in a space defined below a horizontal plane including a top end of the transmission and behind a vertical plane including an axis of rotation of the crankshaft.

21 Claims, 15 Drawing Sheets

AUTOMOBILE POWERTRAIN STRUCTURE INCLUDING AUTOMATIC TRANSMISSION FOR TRANSVERSE ENGINE

BACKGROUND OF THE INVENTION

Field of the Invention

This invention relates to a particular construction of a powertrain on an automobile of a type including an engine and an automatic transmission having an assembly of hydraulically operated devices, such as shift valves. The invention particularly relates to a powertrain in which the engine and the automatic transmission are transversely disposed and arranged one behind the other.

Description of Related Art

Typically, in automotive vehicles, the design of a powertrain primarily depends upon whether an engine and a transmission are mounted transversely or lengthwise in an engine volume formed in the vehicle body. In transversely mounted powertrain arrangements, some powertrains are formed so that transmissions are positioned in front of or behind and parallel to engines. Such a powertrain, including a engine and a transmission, is made compact in size, both lengthwise and transversely. This type of powertrain is known, for instance, from Japanese Patent Publication No. 47-9,448.

In a powertrain of this kind, it was thought a valve body for hydraulically controlling the automatic transmission should be disposed in an open space in an engine compartment such as, for instance, on one side of the transversely mounted engine in the transverse direction. In this type of valve body arrangement, however, the powertrain is made long in the transverse direction, and compactness of the powertrain is affected. Moreover, if the valve body is disposed in a space above either the engine or the transmission, at least part of a hood enclosing the engine compartment must be raised From a viewpoint of maintaining and servicing of the valve body, it is necessary to provide easy access to the valve body. In order to service, repair or exchange valves and other elements of the valve body, the valve body is preferably made compact in size or short in length, width, or both length and width. The valve body should particularly be made compact if the valve body is removed from the underside of the vehicle body.

The valve body must be in appropriate hydraulic communication with servo mechanisms and friction elements of an automatic transmission via a plurality of hydraulic passages. Consequently, if the valve body is short in length and/or in width, it is difficult to compactly form the hydraulic passages in the valve body so that the hydraulic passages appropriately communicate with corresponding hydraulic passages for the servo mechanisms and friction elements of the automatic transmission. In addition, a transmission oil pump, which is absolutely necessary for operating the automatic transmission, is typically connected to one end of an engine crank shaft remote from an end of the crank shaft to which a torque converter is connected. Such an oil pump arrangement, however, causes the powertrain to be long in the transverse direction. Furthermore, a hydraulic passage between the valve body of the automatic transmission and the transmission oil pump must be long.

In a known powertrain construction, a torque converter is connected to one end of a crank shaft remote from the end of the crank shaft to which a transmission oil pump is connected. A front differential is disposed below the transmission gear mechanism. Such a powertrain is disclosed by, for instance, Japanese Unexamined Patent Publication No. 1-316,561.

It is typical to provide an axle with left and right joints on both sides of the differential at equal distances from left and right wheels. If the differential is offset on one side with respect to the center of the engine compartment in the transverse direction, left and right portions of the axle shaft, to which side gears of the differential are fitted, are unavoidably different in length from each other. A center bearing must be provided so as to support a longer portion of the axle in such a construction. In order to assemble the axle to the powertrain, a differential casing is formed with a through bore. The axle is inserted for assembly through this through bore. Before inserting the axle, the center bearing is fitted in the bore of the differential casing. Then, oil seal rings are press-fitted in the bore on both sides of the center bearing. Thereafter, the longer portion of the axle is inserted into the bearing. The inner end of the longer portion of the axle is fitted to the side gear of the differential. Assembling the axle in such a way complicates assembly and causes much time to be expended.

SUMMARY OF THE INVENTION

It is one object of this invention to provide a compact powertrain, having an engine and an automatic transmission arranged transversely and parallel to each other, in which a valve body is compactly arranged.

It is another object of this invention to provide a powertrain in which hydraulic passages can be arranged suitably and compactly between a transmission oil pump and a valve body.

It is still another object of this invention to provide a powertrain in which an axle is easily assembled.

The foregoing objects of the present invention are accomplished by providing a particular powertrain structure in which an engine is placed within the engine compartment so that its crankshaft is oriented in a transverse direction of a vehicle body. An automatic transmission is placed within the engine compartment behind the engine. The automatic transmission has an input shaft and an output shaft arranged coaxially with each other and directed parallel to the crankshaft of the engine. A torque converter is operationally coupled to the crankshaft and the input shaft. A control valve means, such as shift valves assembled into one valve body unit, is placed in a space defined (1) below a horizontal plane including a top of the automatic transmission and (2) behind a vertical plane including an axis of rotation of the crankshaft. The valve body unit permits hydraulic pressure to be applied therethrough to the automatic transmission to shift the automatic transmission.

According to a specific embodiment, when the engine is mounted so as to incline the top end of the engine backward with respect to the crankshaft of the engine, the valve body is attached under the automatic transmission behind a front axle shaft through a spacer, which is formed with a plurality of hydraulic passages hydraulically communicating the valve body with the automatic transmission.

Placing the valve body in an open space formed under the automatic transmission allows the powertrain to be short in a lengthwise direction of the vehicle body, so as to be mounted compactly in the engine compartment. In addition, the powertrain, thus structured, allows a hood of the engine compartment to be at a lower level. Furthermore, the powertrain provides easy access to the valve body from under the vehicle body. Servicing of the powertrain, therefore, is convenient.

BRIEF DESCRIPTION OF THE DRAWINGS

The above and other objects and features of the present invention will be apparent to those skilled in the art from the following description of preferred embodiments thereof when considered in conjunction with the drawings. In the drawings, the same reference numerals have been used to indicate the same or similar parts or elements throughout.

DETAILED DESCRIPTION OF THE PREFERRED EMBODIMENTS

Figure 1:
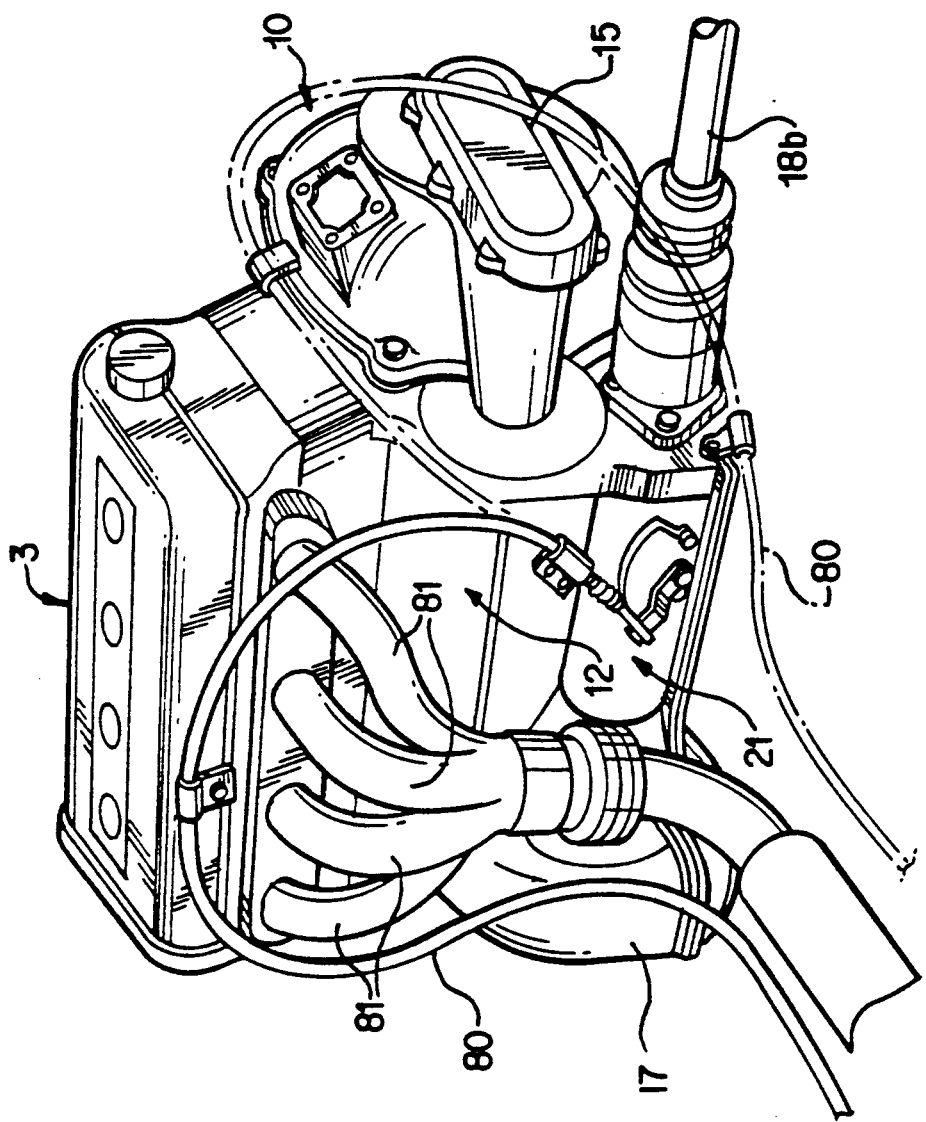
FIG. 1 is a perspective view showing the outer appearance of a powertrain in accordance with a preferred embodiment of the present invention.
Figure 2:
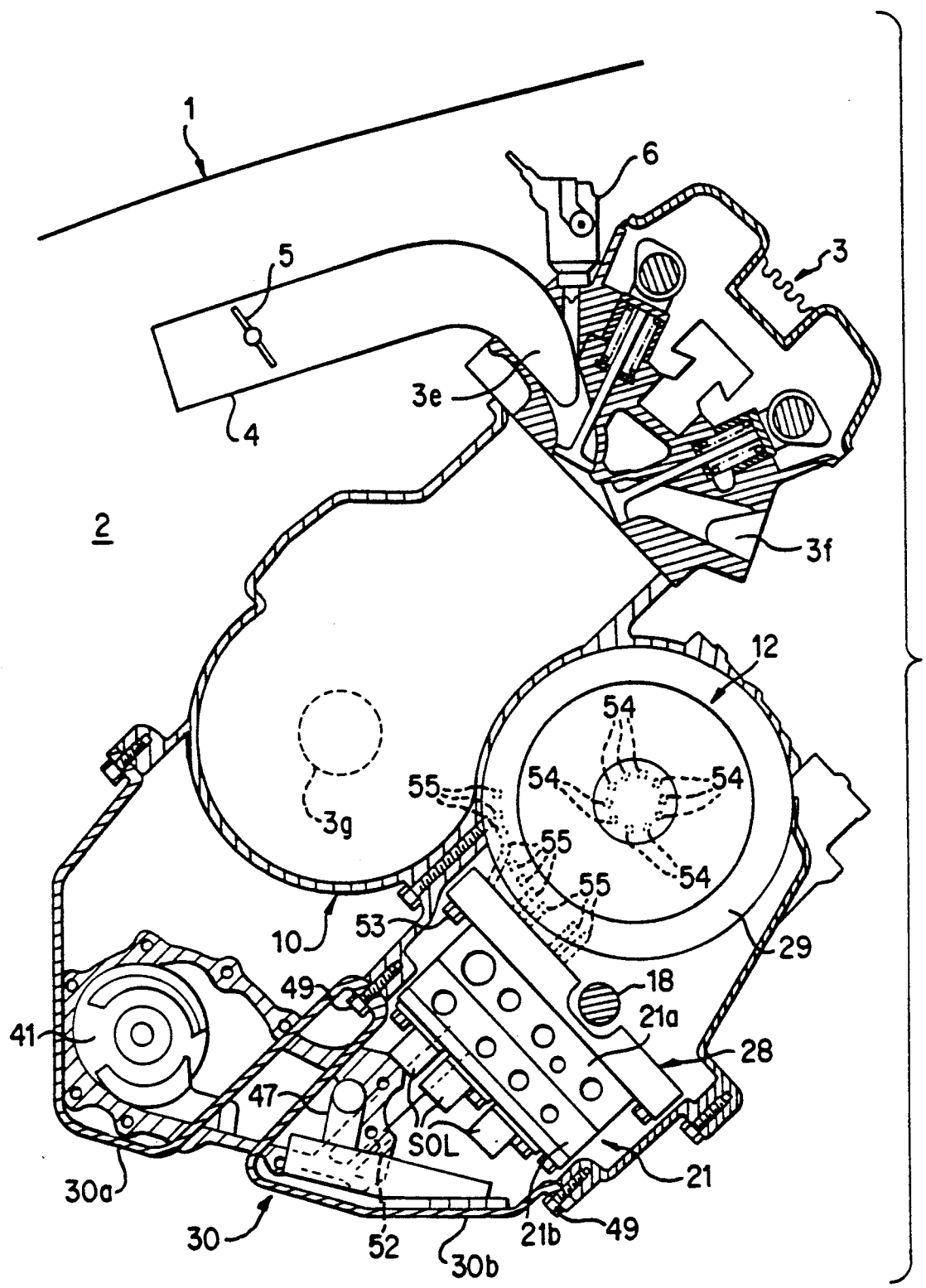
FIG. 2 is a vertical sectional view of the powertrain shown in FIG. 1.
Figure 3:
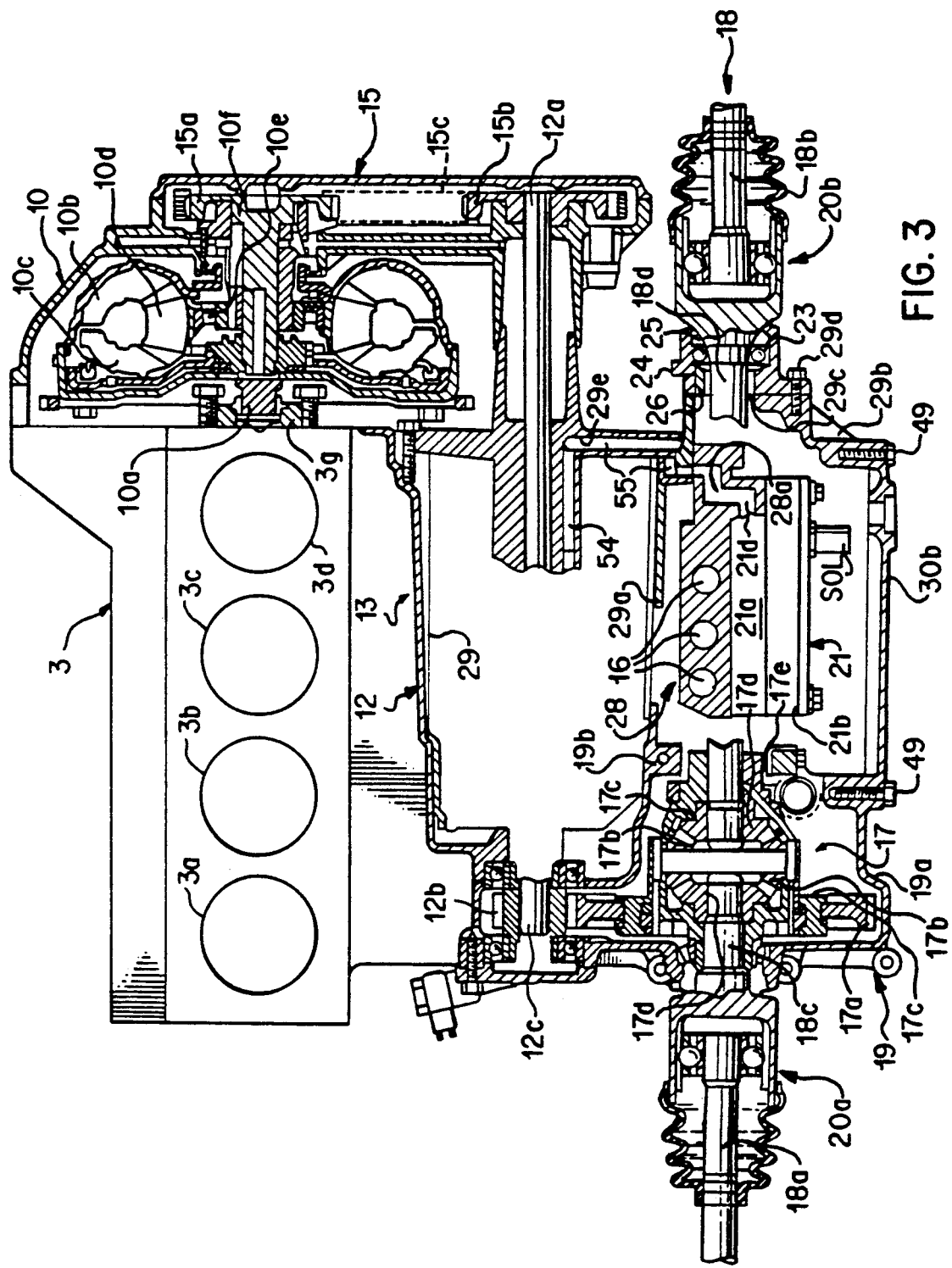
FIG. 3 is a cross-sectional view of the powertrain shown in FIG. 1.

Referring to the drawings in detail and, in particular, to FIGS. 1, 2 and 3, a powertrain for use with a front engine-front drive vehicle, according to a preferred embodiment of the present invention, is shown. The powertrain includes an engine, such as a four cylinder, inline, internal combustion engine 3. The engine 3 is equipped with an automatic transmission 13 including a torque converter 10 and a transmission gear mechanism 12 having, for instance, four forward gears and a backward or reverse gear. The automatic transmission 13 includes a valve body 21 for hydraulically controlling the torque converter 10 and the transmission gear mechanism 12. The valve body 21 is located under the transmission gear mechanism 12 behind the engine 3. The engine 3 is disposed in an engine compartment 2 defined under a hood 1 forming part of an upper front portion of the vehicle. The engine 3, having a crank shaft 3g extending in a transverse direction of the engine room 2, is provided with four cylinders 3a, 3b, 3c and 3d arranged in a straight line and parallel to the crankshaft 3g. The engine 3 is mounted so that it is slanted backward at an appropriate angle.

Engine 3 is formed with intake ports 3e and exhaust ports 3f for the respective cylinders 3a to 3d. Each intake port 3e is connected to an intake passage 4, in which a throttle valve 5 is disposed. A fuel injector 6 is provided so as to inject fuel into each intake port 3e. Torque converter 10 is disposed on one side of the engine 3 and the transmission gear mechanism 12. The transmission gear mechanism 12 has an input shaft 12a disposed parallel to the crankshaft 3g. The torque converter 10 is connected to one end of the crankshaft 3g of the engine 3 through an input shaft 10a. The torque converter has an impeller 10b connected to the input shaft 10a, a turbine 10c opposed to the impeller 10b and connected to an output shaft 10f, and a stator 10d disposed between the impeller 10b and the turbine 10c. A one-way clutch 10e is incorporated in the torque converter 10 so as to prevent the stator 10d from rotating in a direction opposite to the direction in which the turbine 10c turns. The torque converter 10 further includes a lock-up clutch 10g for mechanically coupling the output shaft 10f and the crankshaft 3g together. The output shaft 10f of the torque converter 10 is operationally connected to the input shaft 12a of the transmission gear mechanism 12 through a power transmission 15. The power transmission 15 includes a drive sprocket 15a formed integrally with the output shaft 10f, a driven sprocket 15b fastened to an end of the input shaft 12a of the transmission gear mechanism 12, and a chain 15c coupling the sprockets 15a and 15b.

Under the transmission gear mechanism 12, a ring gear 17a of the differential 17 meshes with an output gear 12b of the transmission gear mechanism 12. The output gear 12b is attached to an output shaft 12c of the transmission arranged coaxially with the input shaft 12a of the transmission. The differential 17 is mounted on an axle 18 between a first left portion 18a for a front left wheel (not shown) and a first right portion 18b for a front right wheel (also not shown). The differential 17 is offset to the right of center of the width of the engine room 2 because of the transverse position of the output gear 12b of the transmission gear mechanism 12. Additionally, the differential 17 has a ring gear 17a, two pinion gears 17b and 17b, and two side gears 17c and 17c.

Axle 18 includes a second left portion 18c for the front left wheel and a second right portion 18d for the front right wheel. The portions 18c and 18d are fitted to respective bores 17d and 17d formed in the side gears 17c and 17c of the differential 17. The first and second left axle portions 18a and 18c are joined by a universal joint 20a for "integral", i.e., unitary, rotation. Similarly, the first and second right axle portions 18b and 18d are joined by a universal joint 20b for integral rotation. The second right axle portion 18d is made greater in length than the second left axle portion 18c because of the offset location of the differential 17. The axle 18 is provided as a subassembly or united structure including a center bearing 23, a cylindrical side casing 24, an oil seal 25 and an O-ring 26. The center bearing 23 supports the second right axle portion 18d at a position adjacent to the universal joint 20b. The side casing 24 is disposed radially outside of the center bearing 23. The oil seal 25 is disposed on one side of the universal joint 20b relative to the center bearing 23, and the O-ring 26 is disposed radially outside of a portion of the side casing 24 close to the second right axle portion 18d. A casing 19 of the differential 17 is formed by a casing portion 19a covering the differential 17, a case portion 19b extending along the second right axle portion 18d, a lower casing portion 29a of a transmission casing 29 of the transmission gear mechanism 12, and a lower casing extension 29b extending downward from a side portion of the transmission casing 29 on a side of the torque converter 10. A casing extension 30b of the transmission casing 29 extends parallel to the second right axle portion 18d of the axle 18. In the lower casing extension 29b, a shaft bore 29c is formed for receiving the second right axle portion 18d of the axle portion 18. In this axle subassembly 18, the second right axle portion 18d is inserted into the lower casing extension 29b of the transmission casing 29 through the shaft bore 29c. The side casing 24 is secured to the lower casing extension 29b of the transmission casing 29 by a bolt 29d so as to cover the shaft bore 29c. One end of the second right axle portion 18d is fitted into the bore 17d of the differential 17.

Valve body 21 includes various hydraulic elements, such as shift valves and clutches, and a plurality of solenoid valves (SOL) attached thereto. The valve body is provided to hydraulically shift the transmission gear mechanism 12, and is disposed below the transmission gear mechanism 12 and the axle 18. The valve body 21 is made by two body portions, i.e., an upper valve body portion 21a and a lower valve body portion 21b. The oil pan 30 is divided into two compartments, namely, an engine oil pan compartment 30a, in which engine lubrication oil is reserved, and a transmission oil pan compartment 30b, in which oil is reserved for the automatic transmission 13. The transmission oil pan compartment 30b, which covers the valve body 21, is fixed to the transmission casing 29 by bolts 49. In order to provide easy removal of the valve body 21, obliquely forward from under the vehicle body, for servicing, the valve body 21 is made short in both the lengthwise and transverse directions, or compact in its overall dimensions. The valve body 21 is hydraulically connected to the transmission gear mechanism 12 and performs shift operations of the automatic transmission 13.

Transmission casing 29 in the transmission gear mechanism 12 is formed with a number of hydraulic passages 54 and 55, through which oil is supplied to the friction elements in the transmission gear mechanism 12. In the upper valve body portion 21a of the valve body 21, a plurality of hydraulic passages 21d is formed so as to apply hydraulic pressure to the shift valves in the valve body 21.

As shown in FIG. 2, a generally rectangular intermediate spacer 28 is disposed between the valve body 21 and the transmission gear mechanism 12 under the axle 18. The intermediate spacer 28 is secured to the transmission casing 29 by bolts 53. As can be clearly seen in FIG. 2, the intermediate spacer 28 is formed so as to be wider in the lengthwise direction of the vehicle that the valve body 21. The intermediate spacer 28 is formed, in its one end portion near the torque converter 10, with a plurality of hydraulic passages 28a arranged in a row in the lengthwise direction. Each of the hydraulic passages 28a has one end which is in communication with the hydraulic passages 21d formed in the upper valve body portion 21a, as shown in FIG. 3. The other end of each of the hydraulic passages 28a is in communication with the hydraulic passages 55 formed in the transmission gear mechanism 12. Through these hydraulic passages 21d, 28a, 55 and 54, hydraulic working oil, supplied through the valve body 21, is supplied to the servo mechanisms and the friction members of the transmission gear mechanism 12. The hydraulic working oil is then discharged into an oil tank passing through the corresponding hydraulic passages in a reverse course. A plurality of accumulators 16 is arranged so that the accumulators 16 are arrayed in a transverse straight line in the intermediate spacer 28 on a side of the hydraulic passages 28a near the transverse center of the vehicle. The accumulators are provided for applying pressure which is varied at a predetermined rate and with a time delay so that the hydraulic pressure increases and decreases.

Figure 4:
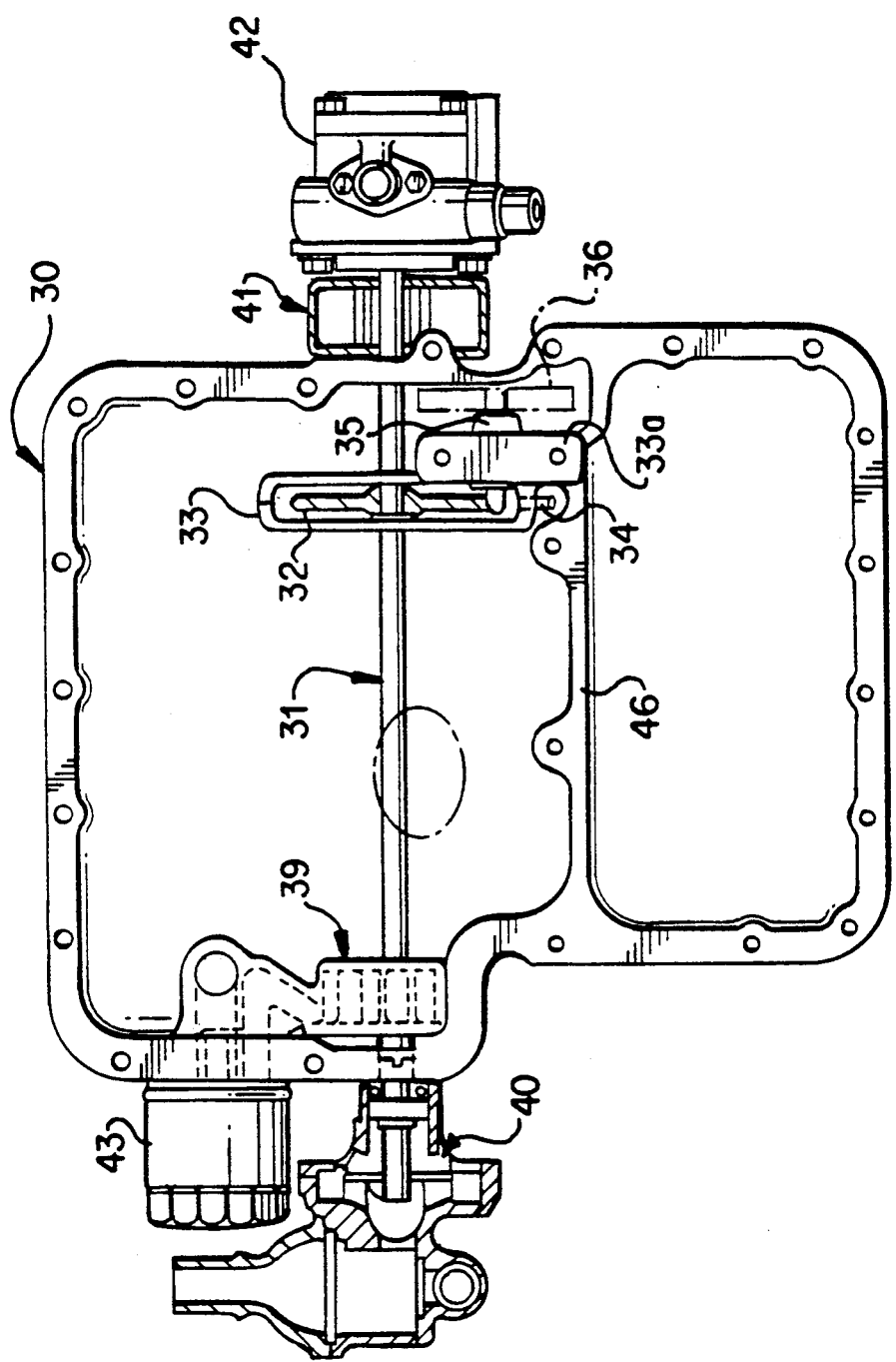
FIG. 4 is a plan view of an oil pan of the powertrain shown in FIG. 1.

As is shown in FIG. 4, the oil pan 30 is disposed under the engine 3 for reserving oil therein. A drive shaft 31 for driving auxiliary devices is disposed so as to extend in the transverse direction. The drive shaft 31 passes through the center of the oil pan 30. The drive shaft 31 is also provided with a driven sprocket 32 located within a sprocket compartment 33. A drive sprocket 34 is rotatively attached to the sprocket compartment 33. The driven sprocket 32 and drive sprocket 34 are operationally coupled to each other by a chain or a belt (not shown). The oil pan 30 is formed with an intermediate wall extension 33a adjacent to the sprocket compartment 33. A shaft 35 is rotatably mounted on and penetrates the intermediate wall extension 33a. The drive sprocket 34 is fixedly connected to one end of the shaft 35. The shaft 35 is provided with a idle gear 36 secured to the other end thereof. The idle gear 36 is engaged with an output gear (not shown) disposed behind the crank shaft 3g of the engine 3. The drive shaft 31 is driven by the crank shaft 3g of the engine 3 through the sprockets 32 and 34. The drive shaft 31 is connected, at one end, to both an engine oil pump 39 for lubricating the engine 3, located in the oil pan 30, and a water pump 40, located outside of the oil pan 30. A transmission oil pump 41 for the automatic transmission 13 and a power steering oil pump 42 for the power steering system, located outside the oil pan 30, are connected to the other end of the drive shaft 31. An oil filter device 43 is provided outside the oil pan 30 for filtering lubrication oil supplied to the engine 3.

Figure 5:
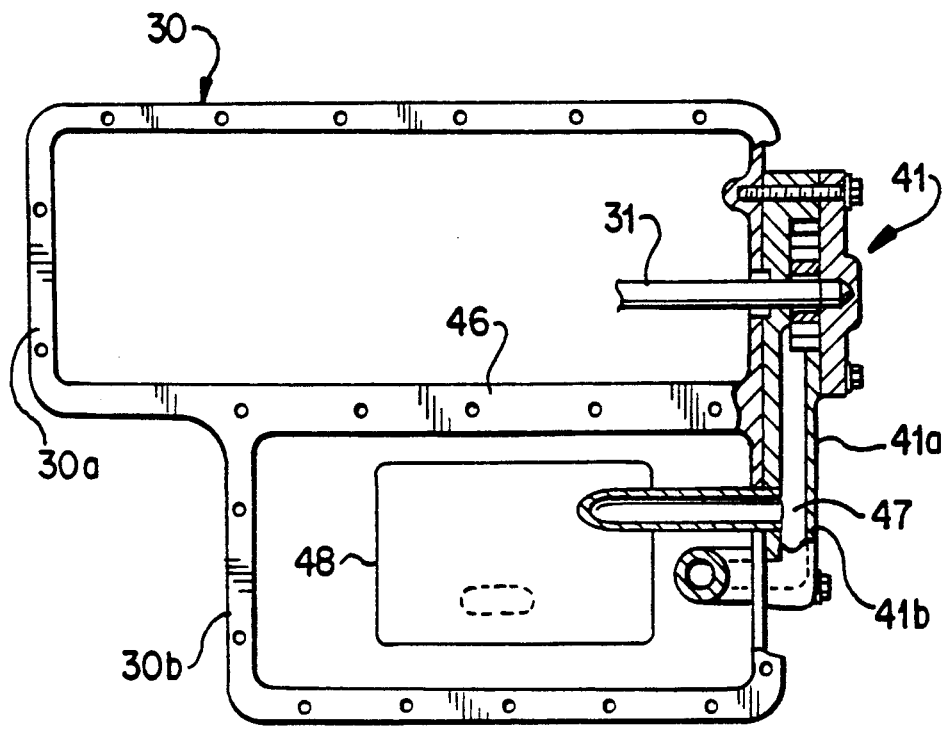
FIG. 5 is a plan view, partly in cross-section, of the oil pan shown in FIG. 4.
Figure 6:
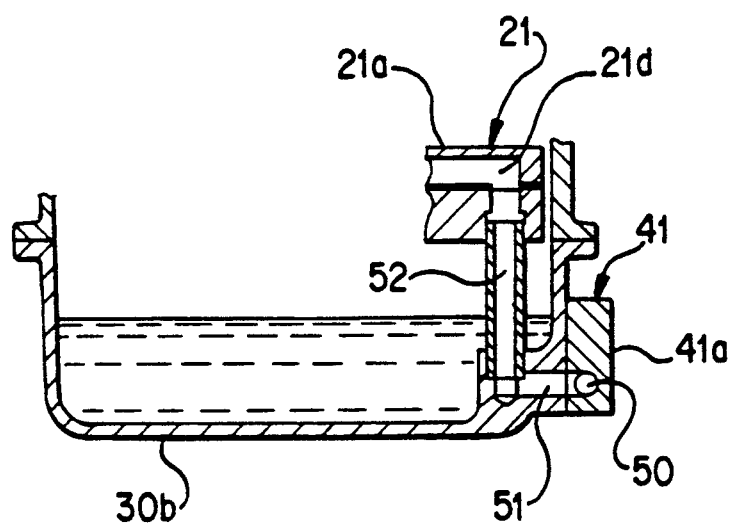
FIG. 6 is a vertical cross-sectional view of the oil pan shown in FIG. 4.

Referring to FIGS. 5 and 6, the oil pan 30 is shown as being divided by a partition wall 46 into an engine oil pan 30a for reserving engine lubrication oil and a transmission oil pan 30b for reserving transmission actuating oil. Such is shown in detail in FIG. 5. The transmission oil pump 41 is provided with an oil pump casing 41a extending toward the back of the engine compartment. A hydraulic passage 47 is formed in a case extension 41b of the end casing 41a. The transmission oil pump 41 sucks oil in the transmission oil pan 30b from a strainer 48 and delivers the oil to the transmission through the hydraulic passage 47. The case extension 41b of the transmission oil pump 41 is formed with a hydraulic passage 50 through which oil is discharged by the transmission oil pump 41. The hydraulic passage 50 communicates with a hydraulic passage 51 extending horizontally in a wall of the transmission oil pan 30b. A pipe 52 extends upwards and connects, at its lower end, to the hydraulic passage 51 and, at its upper end, to the hydraulic passage 21d, formed within the valve body 21, so as to supply oil to the valve body 21 from the transmission oil pump 41.

In the arrangement of the valve body 21 disposed under the transmission gear mechanism 12, a cable, by which a manual valve (not shown) in the valve body 21 is operated to selectively shift the automatic transmission 13 among drive (D), second (S), low (L), neutral (N) and reverse (R) gear ranges, is provided. As is shown in FIG. 1, such a cable 80 can be arranged so as to surround exhaust pipes 81, as illustrated by solid line, or to surround the torque converter 10, as illustrated by broken line. The cable 80, thus arranged, provides sufficient play for the manual valve, even though valve body 21 must be disposed near a passenger compartment of the vehicle.

In the powertrain arrangement described above, the valve body 21 of the automatic transmission 13 is disposed in an open space under the transmission gear mechanism 12, which is inherently dead or open space. Also, the engine 3 and the transmission gear mechanism 12 are disposed transversely and parallel in the engine compartment 2. The powertrain, therefore, is made compact in overall size by utilizing the open space. Furthermore, the powertrain is disposed in a lower overall position when the valve body 21 is located under the front axle 18 than when the valve body 21 is located over the front axle 18. This allows the hood 1 to be at a lower level. In addition, the inclined arrangement of the engine 3 with its top oriented rearward allows the engine to be installed in a limited vertical space and, accordingly, the hood 1 can be at an even lower level. Moreover, the valve body 21 can be easily detached after the transmission oil pan 30b is removed, so as to make servicing of the valve body 21 quite easy.

In the front axle assembly 18, all necessary elements, such as the first and second right axle portions 18b and 18d, the joint 20b, the center bearing 23, the side casing 24, the oil seal rings 25 and the O-ring 26, are prepared as a subassembly unit, so that assembling the front axle 18 to the differential 17 is completed simply by (1) inserting the second right axle portion 18b into the shaft bore 29c formed in the extended portion 29b of the transmission casing 29, and (2) fitting the end of the second right axle portion 18d to the bore 17d of the differential 17 simultaneously with securing the side casing 24 to the extended portion 29b of the transmission casing 29 with a bolt 29d. Accordingly, the conventional necessity of assembling the center bearing 23, the oil seal 25 and their associated elements is avoided, and assembling the differential 17 is easily completed without spending much time. Furthermore, because the oil seal 25 is united with the second right axle portion 18d on one side of the center bearing 23, it prevents oil from leaking through the insertion bore 29c with certainty. Therefore, it is not essential to incorporate oil seals on a left side of the center bearing 23 and a right side of a bearing 17e of the differential 17. In addition, since the center bearing 23 is precisely positioned because the side casing 24 is secured to the extended portion 29b of the transmission casing 29, the second right axle portion 18d is precisely coaxially aligned with the second left axle portion 18c, even though the second right axle portion 18d is longer than the second left axle portion 18c. As a result, differences in rotational speeds between the left wheel and the right wheel are negligible.

In the transmission casing 29, although the hydraulic passages 55, arranged lengthwise in a straight line, are different in position from the hydraulic passages 21d, the hydraulic passages 28a, communicating the hydraulic passages 55 and the hydraulic passages 21d, are provided in the intermediate spacer 28 having a width broader in the lengthwise direction than the valve body 21. Consequently, the hydraulic passages 28a are easily formed. It is not necessary to match positions of the hydraulic passages 21d of the valve body 21 and the hydraulic passages 55 formed within the transmission casing 29. This allows the entire valve body 21 to be made short in length and compact. Since valve body 21 is formed by two body pieces or portions, namely, the upper valve body portion 21a and the lower valve body portion 21b, the valve body 21 is also made short in length and compact.

In a powertrain with the valve body 21 arranged in this way, since the transmission oil pump 41 is driven by the auxiliary device drive shaft 31, which extends transversely and penetrates the oil pan 30, the transmission oil pump 41 is allowed to be located behind the crank shaft 3g of the engine 3. Since it is not necessary to extend the crank shaft of the engine 3 in order to cooperate with the oil pump, the transversely mounted powertrain is allowed to be made compact. Also, since the auxiliary device drive shaft 31 is used commonly by the engine oil pump 39 and the transmission oil pump 41, the auxiliary devices are installed simply and compactly.

The transmission oil pump 41 is located in a different position in the lengthwise direction from that in which the transmission oil pan 30b is located. The transmission oil pump 41 is disposed on a side of the engine oil pan 30a due to the common use of the auxiliary device drive shaft 31. Also, the oil pump casing 41a of the transmission oil pump 41 is extended to the transmission oil pan 30b, and the hydraulic passage 47 is formed in the case extension 41b through which oil in the transmission oil pan 30b is sucked. Therefore, a particular portion is not necessary for forming the hydraulic passage 47.

Valve body 21 provides a decrease in distance between the transmission oil pump 41 located on a side of the oil pan 30 and the valve body 21. Therefore, the hydraulic passage 52, which extends upward so as to communicate with the transmission oil pump 41 and the valve body 21, is allowed to be short in length. This leads to reduced resistance losses of hydraulic pressure and improved reliability in prevention of oil leakage.

Figure 7:
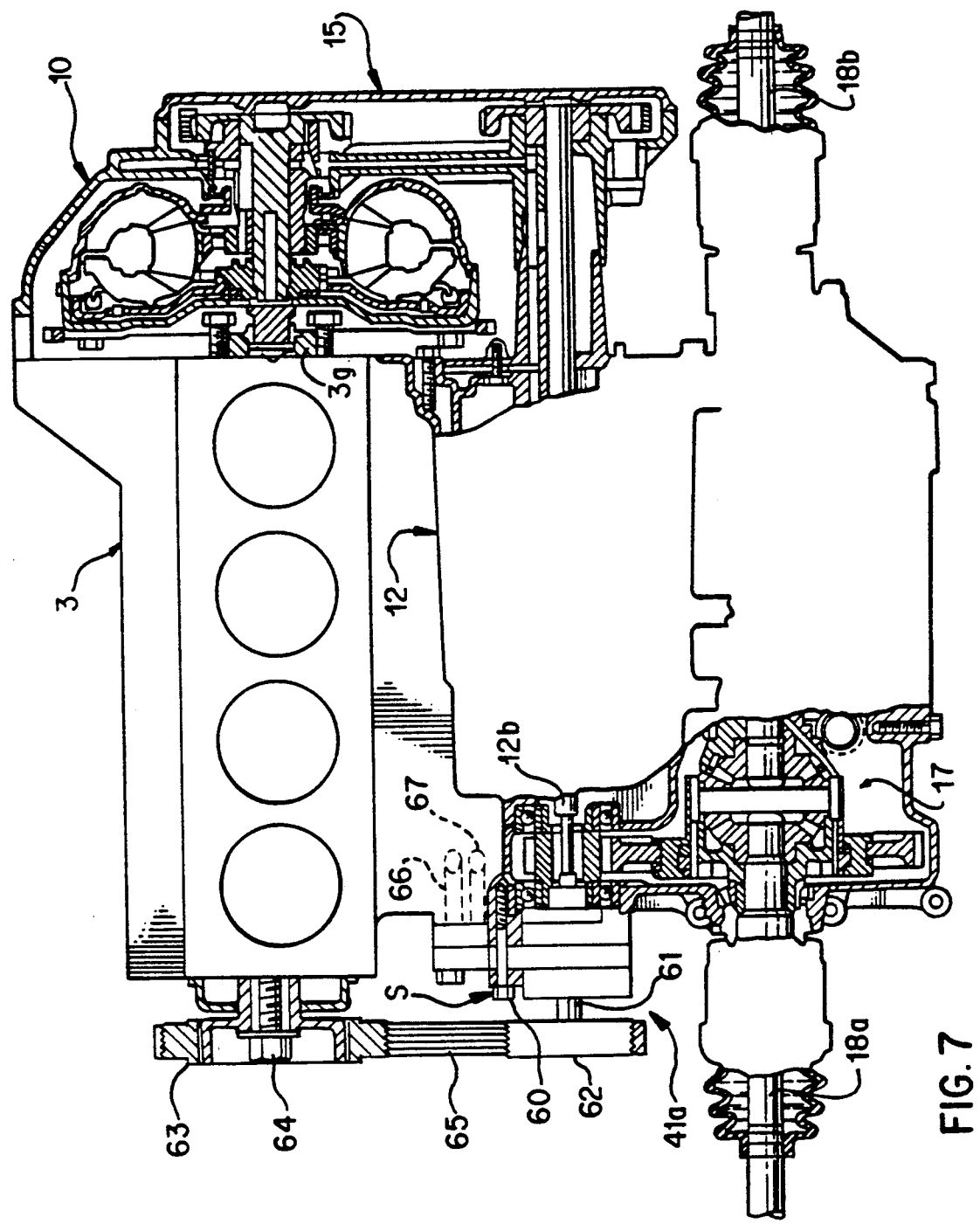
FIG. 7 is a plan view, partly in cross-section, of a powertrain showing a variation of a transmission oil pump arrangement.

FIG. 7 shows a variation of a transmission oil pump arrangement. In this variation, a transmission oil pump 41A is disposed on a side of a transmission gear mechanism 12 opposite to a torque converter 10. Even though the transmission gear mechanism 12 is disposed in a space behind the engine 3, an open space S is left unused on the side of the transmission gear mechanism 12 opposite to the torque converter 10. This is because the shaft of the transmission gear mechanism 12 is short. Consequently, the transmission oil pump 41A is disposed on a left side, as viewed in FIG. 7, of the transmission gear mechanism 12, and is fixed by a bolt 60. The transmission oil pump 41A has a shaft 61 disposed coaxially with the output shaft 12b of the transmission gear mechanism 12. A driven pulley 62 is fixedly mounted on the output shaft 12b.

On the side of the transmission gear mechanism 12 opposite to the torque converter 10, a drive pulley 63 is fixed to an end of the crank shaft 3g of the engine 3 by the bolt 64. The drive pulley 63 and driven pulley 62 are operationally coupled by a belt 65 so that the transmission oil pump 41A is driven by the crank shaft 3g of the engine 3. Oil is sucked by the transmission oil pump 41A from the strainer of the oil pan through a hydraulic passage 66 and supplied to, for instance, the valve body (not shown) through a hydraulic passage 67.

In this transmission oil pump arrangement, since the transmission oil pump 41 is disposed in the open space S left on a side of the transmission gear mechanism 12, the crank shaft 3g of the engine 3 is made short in length as compared to an arrangement in which the transmission oil pump 41A is connected on the crank shaft 3g of the engine 3. The entire powertrain, including the engine 3 and the automatic transmission 13, is also made small in width and hence compact.

Figure 8:
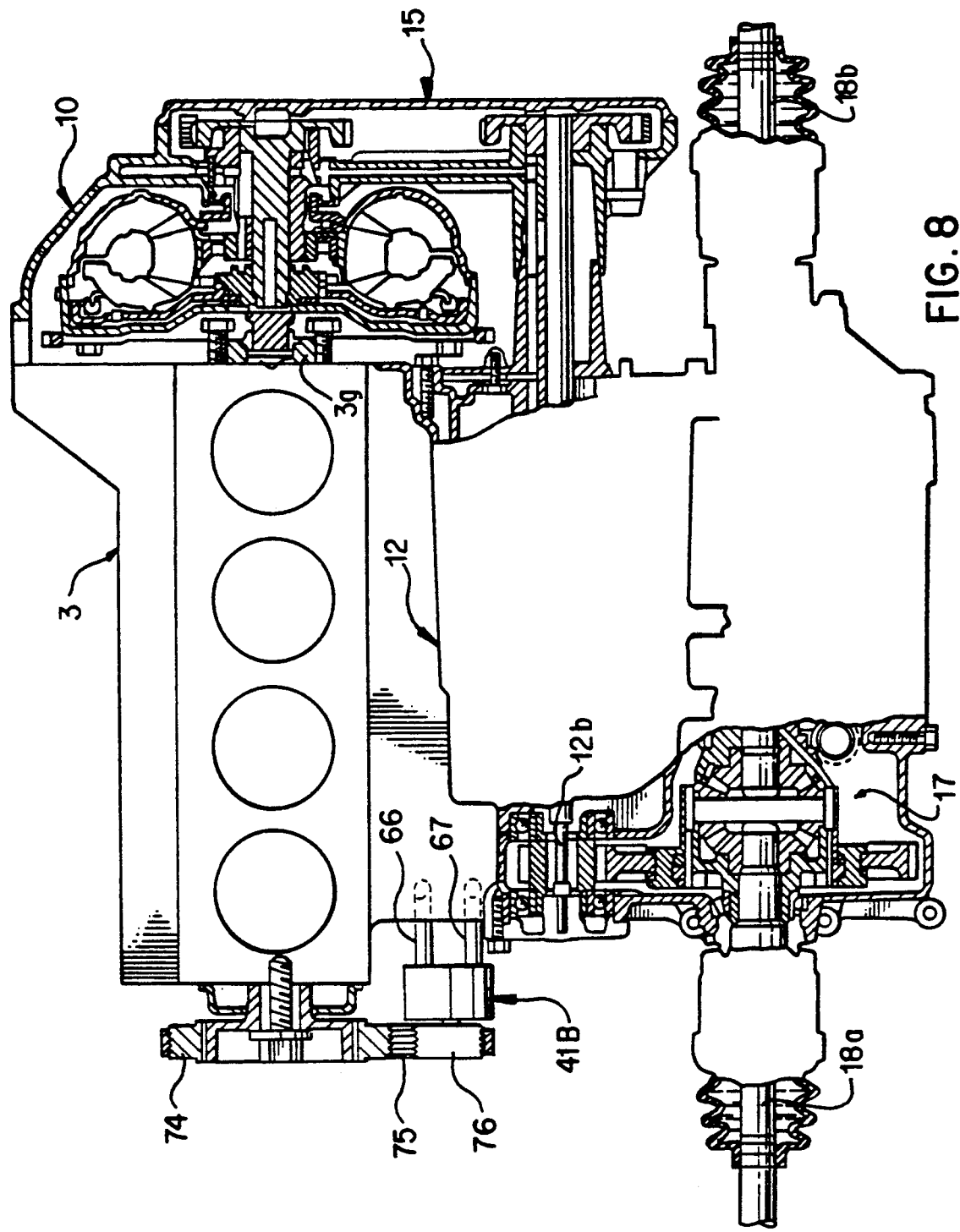
FIG. 8 is a plan view, partly in cross-section, of a powertrain showing another variation of a transmission oil pump arrangement.
Figure 9:
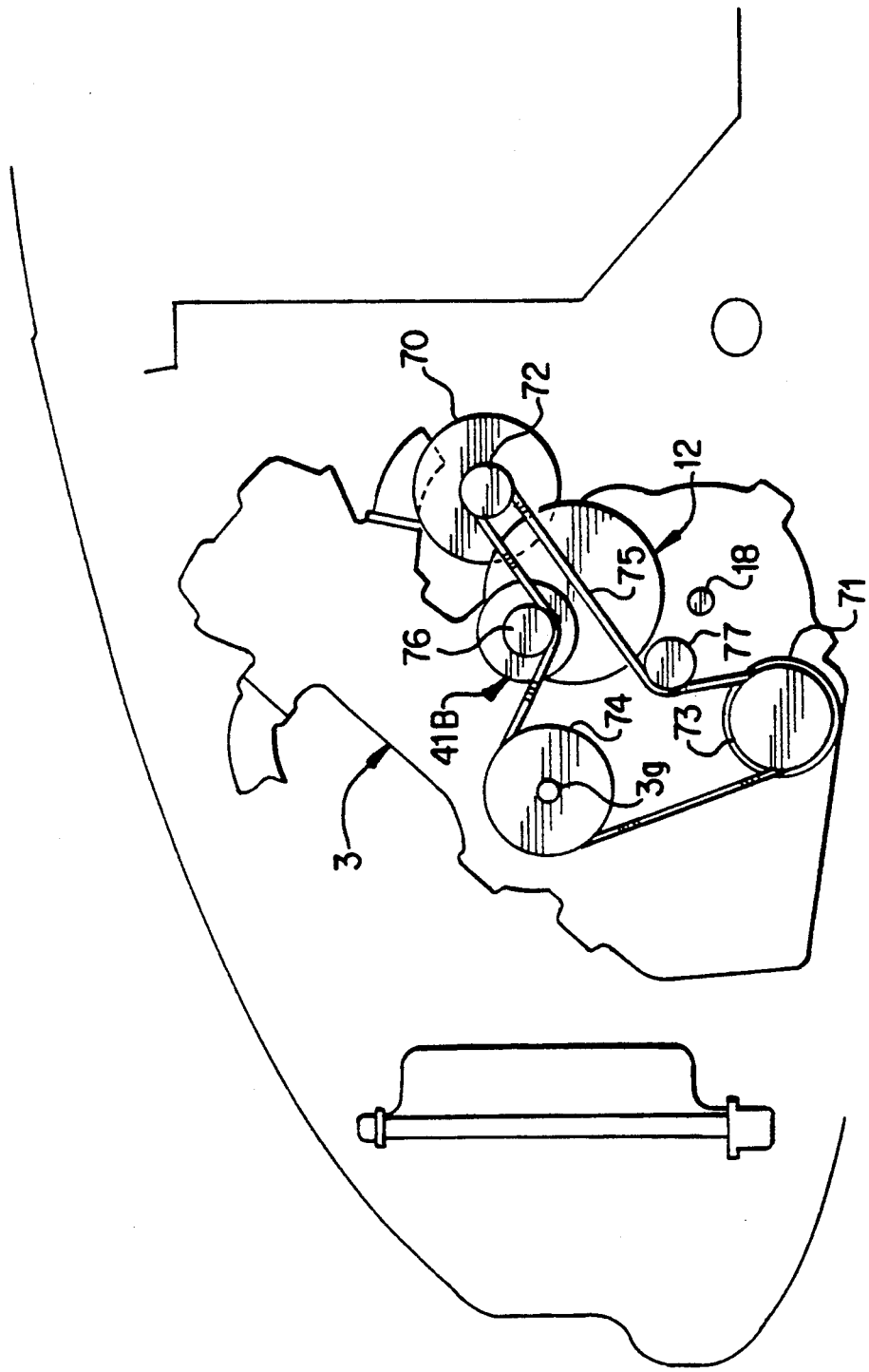
FIG. 9 is a schematic side view of the powertrain shown in FIG. 8.

FIGS. 8 and 9 show another variation of a transmission oil pump arrangement in which a transmission oil pump 41B is off-axially disposed with respect to the crank shaft 3g of the engine 3. An auxiliary device 70, such as an alternator, is disposed behind both the crank shaft 3g and the transmission gear mechanism 12. Another auxiliary device 71 is disposed under the engine 3. A belt 75 operationally couples driven pulleys 72 and 73 and a crank pulley 74, mounted on the end of the crank shaft 3g so as to drive the auxiliary devices 70 and 71 by the engine 3. Between the crank pulley 74 and the driven pulley 72, there is disposed an upper idler 76 for applying an appropriate tension to the belt 75 which is disposed off-axially with the crank shaft 3g. A lower idler 77, similar in structure to the upper idler is also provided between the auxiliary devices 70 and 71. The transmission oil pump 41B is operationally coupled to the upper idler 76 so as to be driven by the upper idler 76.

In the arrangement of the transmission oil pump 41B, since the transmission oil pump 41B is disposed off-axially relative to the crank shaft 3g, the crank shaft 3g of the engine 3 is made short in length and, accordingly, the powertrain is made compact. Furthermore, the transmission oil pump 41B is driven by the idler 76, so that the mechanical structure for driving the transmission oil pump 41B is made simple.

Figure 10:
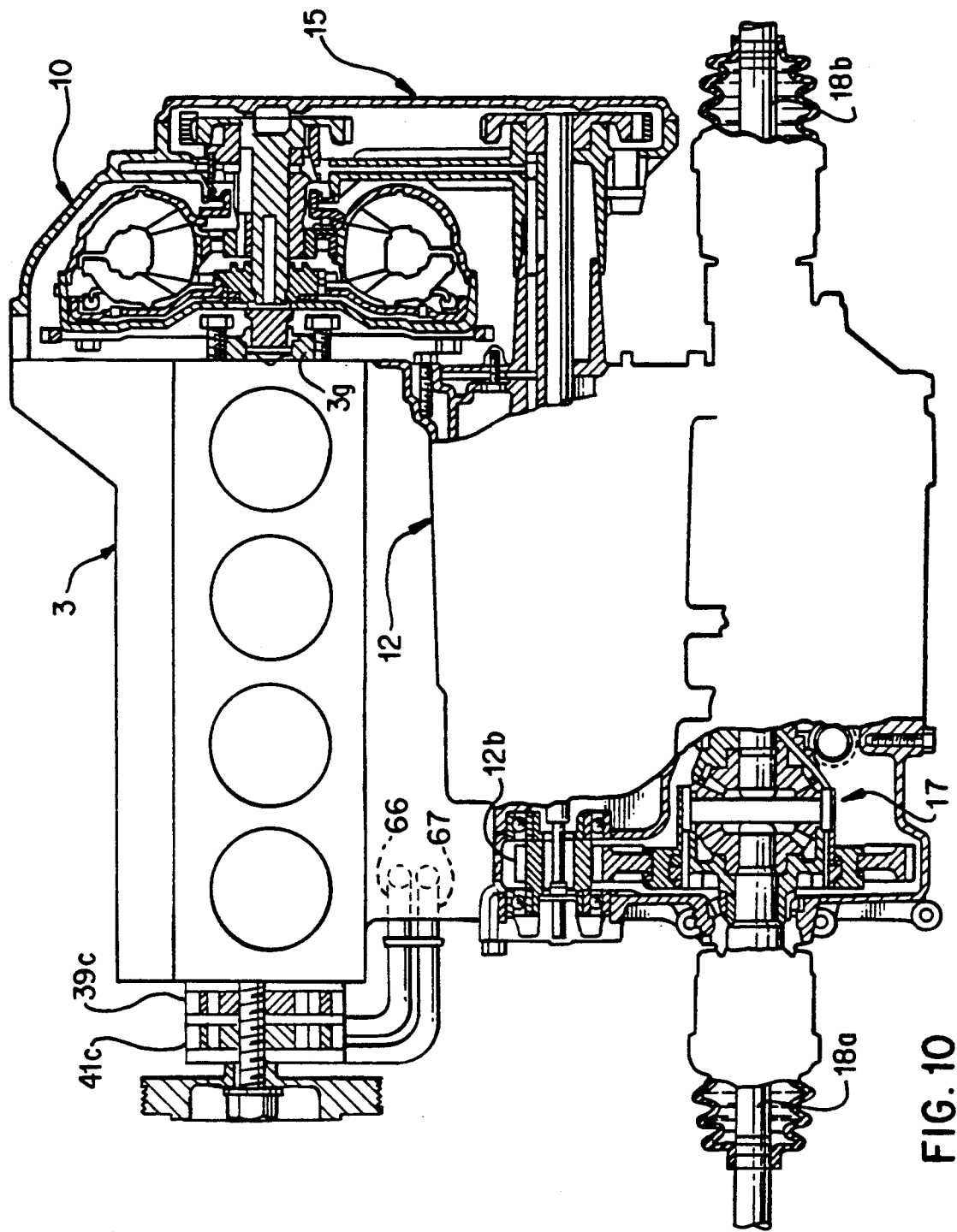
FIG. 10 is a plan view, partly in cross-section, of a powertrain showing a transmission oil pump and engine oil pump arrangement.

FIG. 10 shows another variation of a transmission oil pump arrangement. In this variation, an engine oil pump 39C and a transmission oil pump 41C are arranged side by side and adjacent to the end of the crank shaft 3g of the engine 3 opposite to the torque converter 10.

Figure 11:
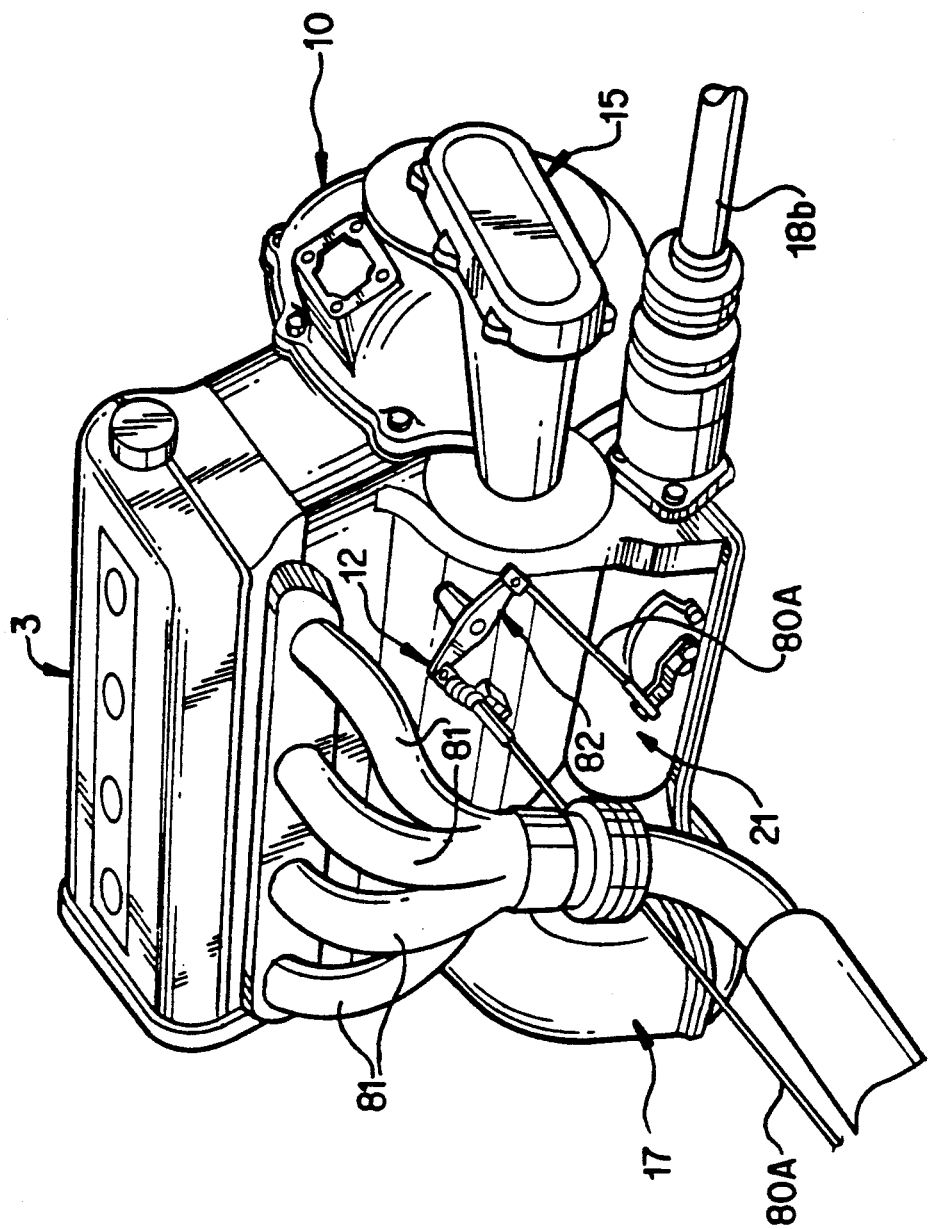
FIG. 11 is a perspective view showing the outer appearance of a powertrain in accordance with another preferred embodiment of the present invention.

FIG. 11 shows a modified cable arrangement. In this arrangement, a cable 80A is connected to the valve body 21 by a link mechanism 82 which is specifically provided in order to provide a sufficient play of the cable 80A so as to operate a manual valve of the valve body 21. The cable 80A operates in the same manner as the cable 80 shown in FIG. 1.

FIGS. 12 to 15 show other variations of powertrain arrangements.

Figure 12:
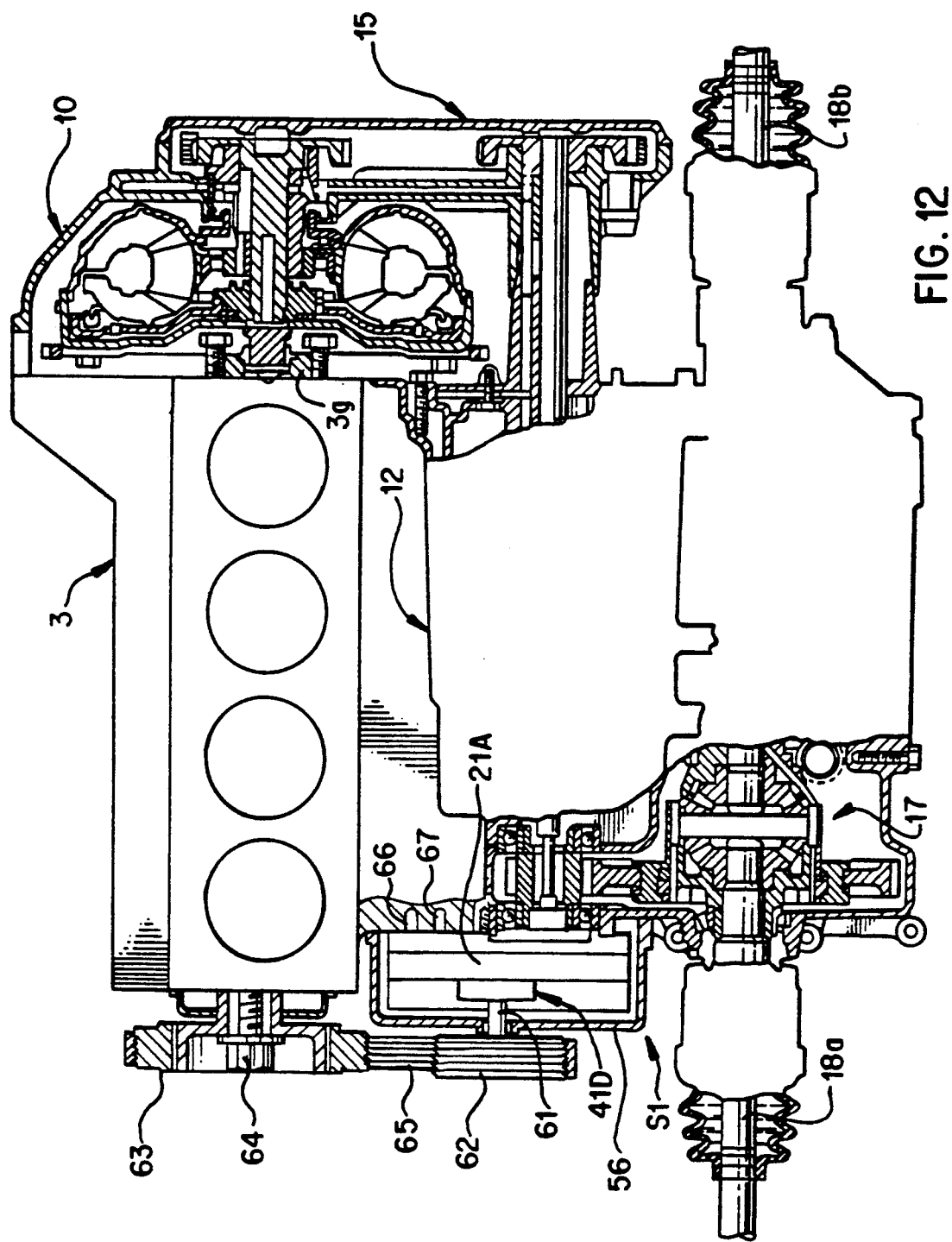
FIGS. 12 and 13 are plan views, partly in crosssection, of a powertrain showing respective variations of a valve body arrangement.

As shown in FIG. 12, although a transmission gear mechanism 12 is disposed in a space behind the engine 3 and because the shaft of the transmission gear mechanism 12 is shorter in transverse length than the engine 3, an open space S1 is provided on one side of the transmission gear mechanism 12 opposite to the torque converter 10. A valve body 21A is disposed in the open space S1 provided on one side of the transmission gear mechanism 12 opposite to a torque converter 10 in the transverse direction. The valve body 21A is disposed in a casing 56 as a unit with a transmission oil pump 41D for the automatic transmission 13. The transmission oil pump 41D has a drive shaft 61 with a driven pulley 62, which is operationally coupled by a belt 65 to a drive pulley 63. The drive pulley 63 is secured by a bolt 64 to a crank shaft 3g at one end opposite to an end to which the torque converter 10 is attached. The transmission oil pump 41D, thus assembled, is driven by the engine crank shaft 3g. A hydraulic passage 66, through which the transmission oil pump 41D sucks oil from an oil pan, and a hydraulic passage 67, through which oil is delivered to frictional elements of the transmission gear mechanism 12 via the valve body 21A, are formed in the casing 56.

As is apparent from the above description, arranging the valve body 21A in the space S1 provided beside the transmission gear mechanism 12 makes it easy to compactly arrange the entire powertrain. Since the valve body 21A can be detached from the upper side of the powertrain, the valve body is easily serviced. Moreover, since the valve body 21A and the transmission oil pump 41D are assembled as a unit, the hydraulic passages provided therebetween are significantly shortened.

Figure 13:
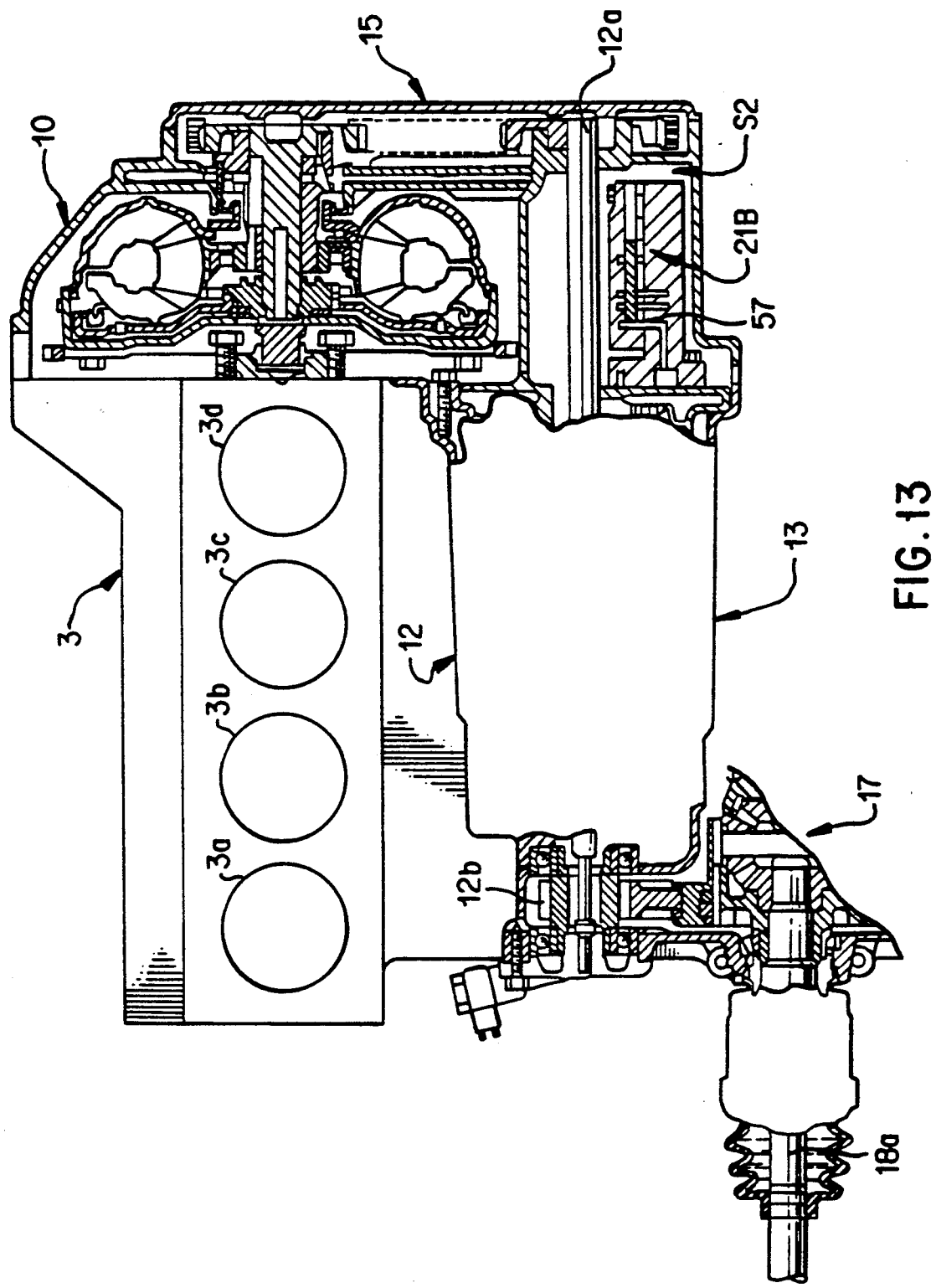
Figure 14:
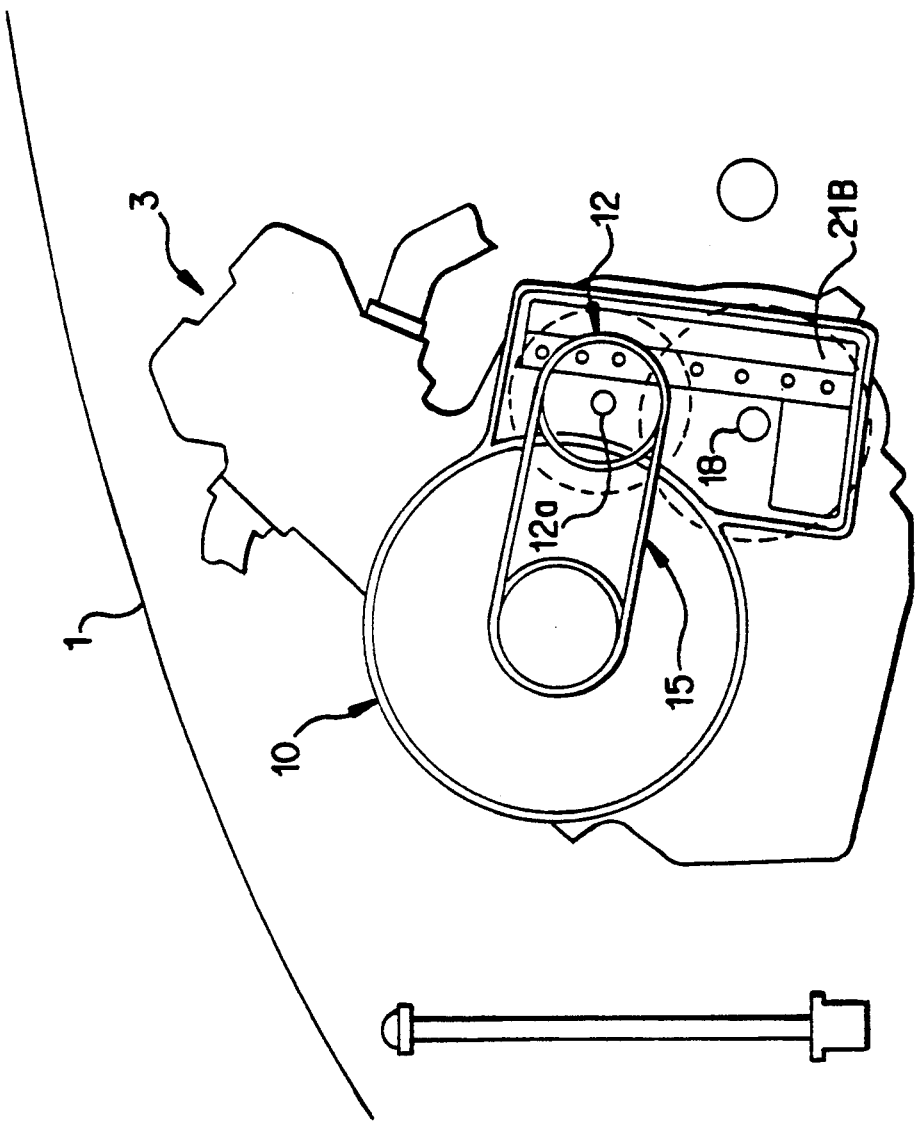
FIG. 14 is a schematic side view of the powertrain illustrated in FIG. 13, showing the valve body arrangement.

FIGS. 13 and 14 show another variation of a powertrain arrangement. In this variation, a transmission gear mechanism 12 itself is disposed directly behind the engine 3 with its input shaft 12a positioned behind a torque converter 10 connected to the engine 3. The transmission gear mechanism 12 partly overlaps the torque converter 10 in a diametrical direction of the transmission gear mechanism 12, as viewed in the transverse direction. The partly overlapped arrangement of the transmission gear mechanism 12 and the torque converter 10 allows the powertrain, including the engine 3 and the transmission gear mechanism 12, to be compactly mounted in the engine room.

On one side adjacent to the torque converter 10 on one side of the transmission gear mechanism 12, i.e., where the input shaft 12a of the transmission gear mechanism 12 is disposed, a space S2 is provided on one side of the input shaft 12a remote from the torque converter 10. A valve body 21B, having shift valves 57 and the like therein, is disposed in the space S2. The valve body 21B has a lower body portion extending forward under a front axle 18 so as to form a generally L-shaped body configuration.

The powertrain, thus arranged, is made compact in the lengthwise direction of the vehicle body because of the partly overlapped arrangement of the torque converter 10 and the transmission gear mechanism 12. Furthermore, since the valve body 21B is disposed behind the input shaft 12a of the transmission gear mechanism 12 within the space S2 provided behind the torque converter 10, the powertrain is arranged compactly and in a short distance in the lengthwise direction.

Figure 15:
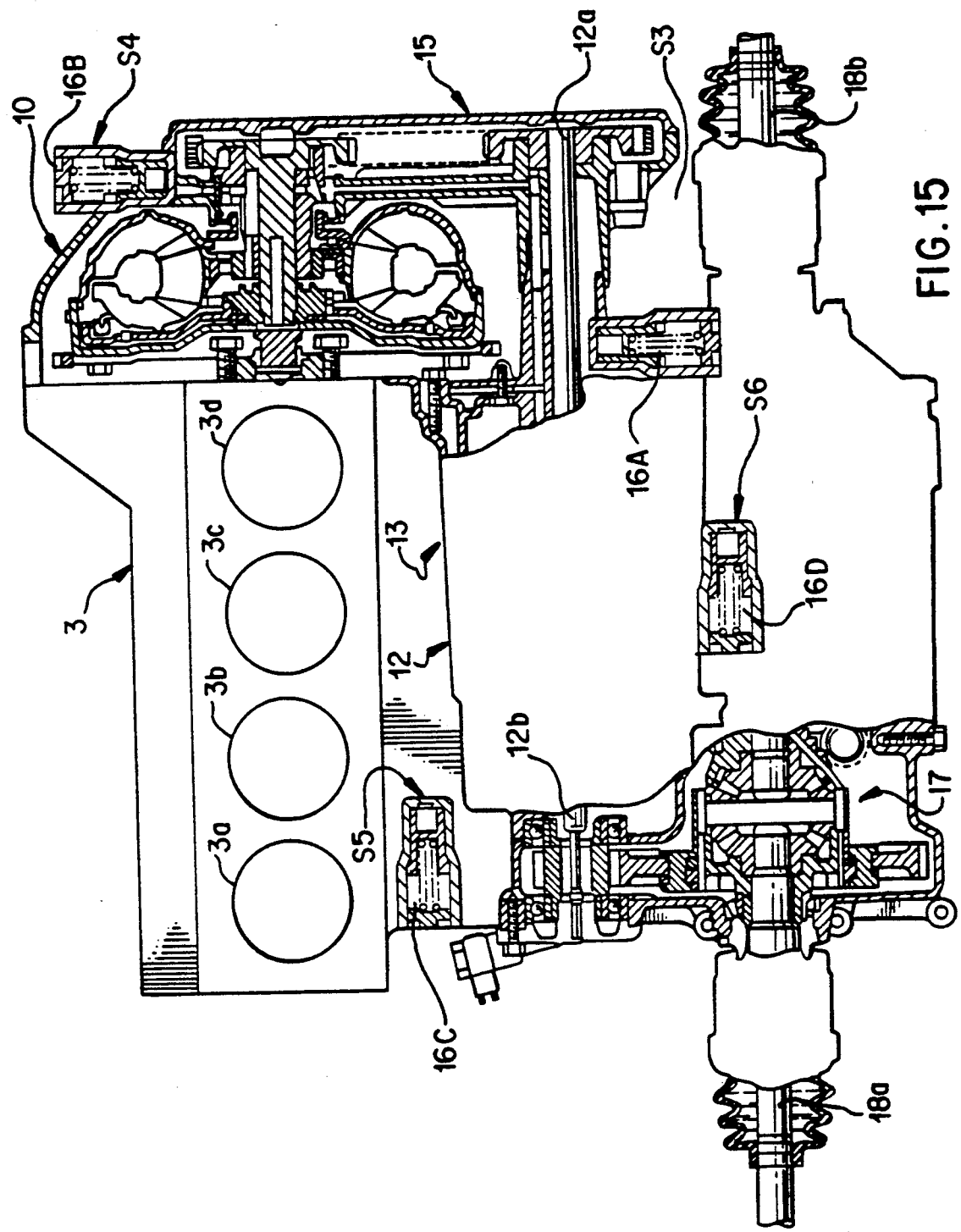
FIG. 15 is a plan view, partly in cross-section, showing another preferred embodiment of the present invention.
Figure 16:
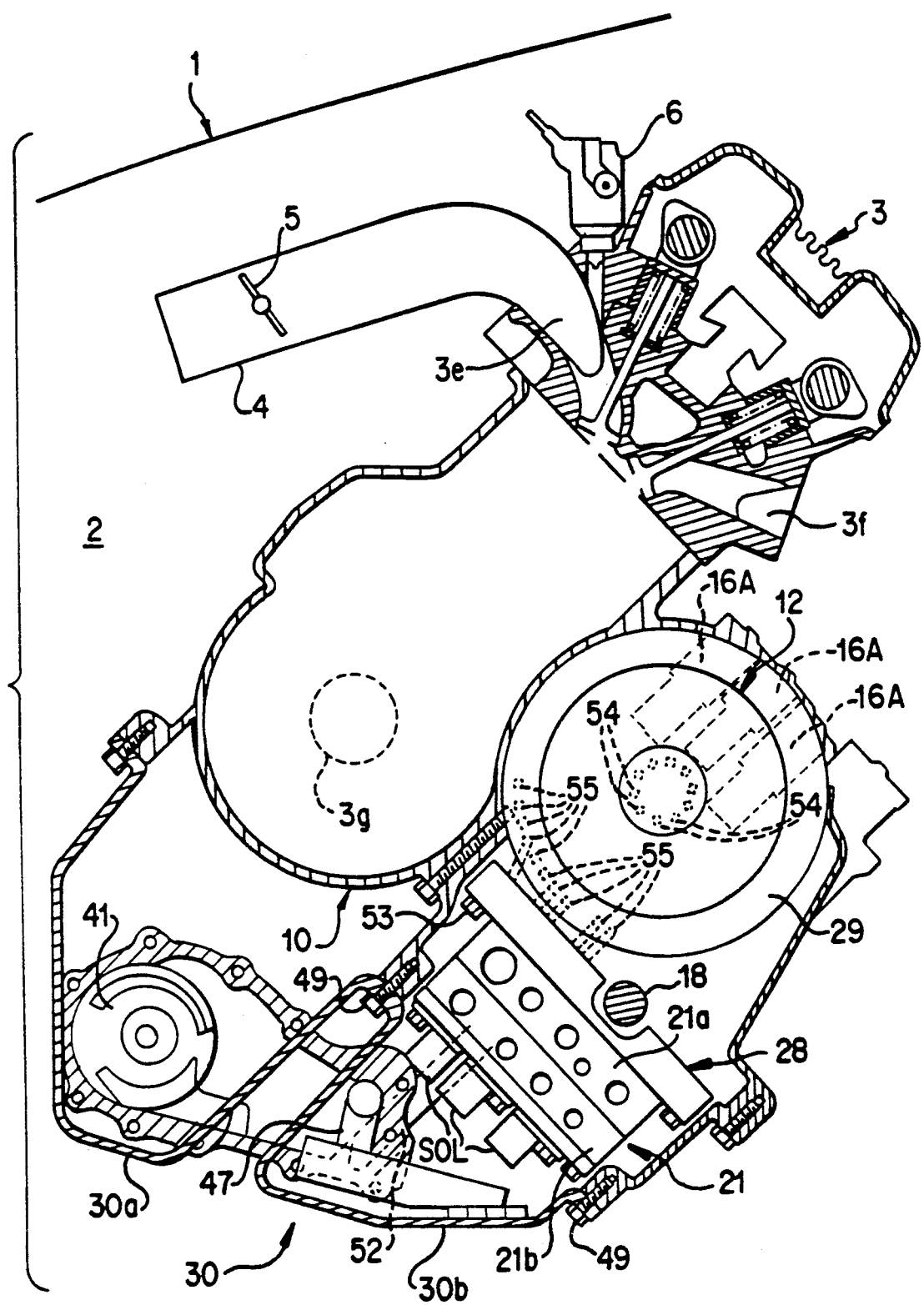
FIG. 16 is a vertical sectional view of the powertrain of FIG. 15 showing an arrangement of accumulators.

FIGS. 15 and 16 show still another variation of a powertrain arrangement, in which accumulators and hydraulic control devices, such as shift valves, other than the accumulators, are separately disposed. A valve body (not shown) includes hydraulic control devices other than the accumulators and may be positioned under the transmission gear mechanism 12 and the front axle 18 as shown in FIG. 2, on one side of the transmission gear mechanism 12 opposite to torque converter 10 in the transverse direction as shown in FIG. 12, or behind the input shaft 12a of the transmission gear mechanism 12 as shown in FIG. 13. These valve body positions may be selected according to design specifications.

Accumulators may be positioned in an open space S3 provided above an input shaft 12a of a transmission gear mechanism 12 as designated by a reference numeral 16A in FIG. 16. The accumulators 16A are arranged upward from and to the rear of the input shaft 12a of the transmission gear mechanism 12.

As is shown in FIG. 15, the accumulators may be positioned in an open space S4 provided on one side of the torque converter 10 remote from the engine in the transverse direction as designated by a reference numeral 16B, in an open space S5 provided between the engine 3 and an output shaft 12b of the transmission gear mechanism 12 in the lengthwise direction as designated by a reference numeral 16C, or in an open space S6 provided between the transmission gear mechanism 12 and the front axle 1B as designated by a reference numeral 16D. It is not necessary to position these accumulators in all spaces, and they may be selectively positioned in one or more than one space.

Since, in this arrangement, the accumulators 16 can possibly be positioned in the open spaces S3 to S6, the powertrain is made even more compact.

It is to be understood that although the present invention has been described in detail with respect to preferred embodiments thereof, various other embodiments and variations may occur to those skilled in the art. Those embodiments and variations which fall within the scope and the spirit of the invention are intended to be covered by the following claims.

What is claimed is:

1. A structure of a powertrain disposed in an engine compartment of an automotive vehicle, comprising:
   an engine placed within the engine compartment, said engine having a crankshaft directed in a transverse direction of a vehicle body;
   an automatic transmission placed within the engine compartment behind said engine, said automatic transmission having an input shaft and an output shaft which are arranged coaxially with each other and directed parallel to said crankshaft;
   a torque converter operationally coupled to said crankshaft and said input shaft; and
   control valve means for applying controlled hydraulic pressure to said automatic transmission therethrough so as to shift said automatic transmission, said control valve means being placed in a space defined below a horizontal plane including a top of said automatic transmission and behind a vertical plane including an axis of rotation of said crankshaft.

2. A structure of a powertrain according to claim 1, wherein said control valve means comprises shift valves which are assembled as one valve body unit.

3. A structure of a powertrain according to claim 2, wherein said valve body unit is placed under said automatic transmission and under a front axle of said automotive vehicle.

4. A structure of a powertrain according to claim 3, and further comprising a spacer through which said valve body unit is attached to said automatic transmission, said spacer being formed with a plurality of hydraulic passages which hydraulically communicate said valve body unit with said automatic transmission.

5. A structure of a powertrain according to claim 4, wherein said valve body unit comprises an upper valve body portion and a lower valve body portion.

6. A structure of a powertrain according to claim 4, wherein said spacer accommodates an accumulator of said control valve means.

7. A structure of a powertrain according to claim 3, and further comprising an oil pan disposed under said engine, an engine oil pump, having a drive shaft arranged in said transverse direction, for lubricating said engine, and a transmission oil pump for applying oil to said automatic transmission, said engine oil pump being placed within said oil pan and operationally coupled to said transmission oil pump through said drive shaft.

8. A structure of a powertrain according to claim 7, wherein said oil pan comprises an engine oil pan compartment and a transmission oil pan compartment divided in said transverse direction.

9. A structure of a powertrain according to claim 8, and further comprising a casing for accommodating said transmission oil pump said casing extending to said transmission oil pan compartment and being formed with a hydraulic passage through which oil is introduced from said transmission oil pan compartment to said transmission oil pump.

10. A structure of a powertrain according to claim 7, wherein said transmission oil pump is placed coaxially with said output shaft on one side of said automatic transmission opposite to said torque converter.

11. A structure of a powertrain according to claim 7, wherein said transmission oil pump is placed off-axially relative to said output shaft on one side of said automatic transmission opposite to said torque converter.

12. A structure of a powertrain according to claim 3, and further comprising a differential having a casing, a pair of side gears to which axles are fastened, a center bearing for supporting each axle, and a side cover forming part of a casing of said automatic transmission for supporting said center bearing.

13. A structure of a powertrain according to claim 2, wherein said valve body unit is placed on one side of said automatic transmission opposite, in said transverse direction, to said torque converter.

14. A structure of a powertrain according to claim 2, wherein said valve body unit is placed behind said torque converter in said transverse direction and on one side of said automatic transmission in said transverse direction.

15. A structure of a powertrain according to claim 2, wherein said engine is mounted with its top inclined backward in a longitudinal direction with respect to said vehicle body.

16. A structure of a powertrain according to claim 1, wherein said control valve means comprises shift valves and an accumulator, said shift valves being assembled as one valve body unit.

17. A structure of a powertrain according to claim 16, wherein said accumulator is placed above said input shaft of said automatic transmission.

18. A structure of a powertrain according to claim 16, wherein said accumulator is placed above said torque converter.

19. A structure of a powertrain according to claim 16, wherein said accumulator is placed between said engine and said automatic transmission.

20. A structure of a powertrain according to claim 16, wherein said accumulator is placed between said automatic transmission and a front axle of said automotive vehicle.

21. A structure of a powertrain disposed in an engine compartment of an automotive vehicle, comprising:

an engine placed within the engine compartment, said engine having a crankshaft directed in a transverse direction of a vehicle body;

an automatic transmission placed within the engine compartment behind said engine, said automatic transmission having an input shaft and an output shaft which are arranged coaxially with each other and directed parallel to said crankshaft;

a torque converter operationally coupled to said crankshaft and said input shaft;

control valve means for applying controlled hydraulic pressure to said automatic transmission therethrough so as to shift said automatic transmission, said control valve means being placed in a space defined below a horizontal plane including a top of said automatic transmission and behind a vertical plane including an axis of rotation of said crankshaft, said control valve means comprising shift valves which are assembled as one valve body unit; and an oil pan disposed under said engine, an engine oil pump, having a drive shaft arranged in said transverse direction, for lubricating said engine, and a transmission oil pump for applying oil to said automatic transmission, said engine oil pump being placed within said oil pan and operationally coupled to said transmission oil pump through said drive shaft;

wherein said transmission oil pump is placed off-axially relative to said output shaft on one side of said automatic transmission opposite to said torque converter and said transmission oil pump is assembled as one unit with said valve body unit.

* * * * *